(12) United States Patent
Baumstein et al.

(10) Patent No.: US 11,340,366 B2
(45) Date of Patent: May 24, 2022

(54) ACCURATE VELOCITY MODEL ESTIMATION AND IMAGING IN THE PRESENCE OF LOCALIZED ATTENUATION (Q) ANOMALIES

(71) Applicants: Anatoly I. Baumstein, Houston, TX (US); Gboyega Ayeni, Humble, TX (US); Carey M. Marcinkovich, The Woodlands, TX (US); Jaewoo Park, The Woodlands, TX (US); Sirui Tan, Spring, TX (US); Peter Traynin, Houston, TX (US)

(72) Inventors: Anatoly I. Baumstein, Houston, TX (US); Gboyega Ayeni, Humble, TX (US); Carey M. Marcinkovich, The Woodlands, TX (US); Jaewoo Park, The Woodlands, TX (US); Sirui Tan, Spring, TX (US); Peter Traynin, Houston, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 318 days.

(21) Appl. No.: 16/571,950

(22) Filed: Sep. 16, 2019

(65) Prior Publication Data
US 2020/0124752 A1 Apr. 23, 2020

Related U.S. Application Data

(60) Provisional application No. 62/746,601, filed on Oct. 17, 2018.

(51) Int. Cl.
*G01V 1/28* (2006.01)
*G01V 1/30* (2006.01)

(52) U.S. Cl.
CPC .............. *G01V 1/282* (2013.01); *G01V 1/301* (2013.01); *G01V 1/303* (2013.01); *G01V 1/306* (2013.01);
(Continued)

(58) Field of Classification Search
USPC .......................................................... 703/2
See application file for complete search history.

(56) References Cited

U.S. PATENT DOCUMENTS

2013/0107665 A1* 5/2013 Fletcher ................. G01V 1/364
367/43
2014/0039799 A1* 2/2014 Krohn ...................... G01V 1/28
702/14

(Continued)

OTHER PUBLICATIONS

Biondo, B., et al. (1999) "Wave-equation migration velocity analysis." *SEG Technical Program Expanded Abstracts*, pp. 1723-1726.
(Continued)

*Primary Examiner* — Paul D Lee
(74) *Attorney, Agent, or Firm* — ExxonMobil Upstream Research Company—Law Department (57) ABSTRACT

Iterative methods for inversion of seismic data to update a physical property model are disclosed. Such methods may comprise iteratively updating the model until a first predetermined resolution is achieved, using full wavefield inversion of the seismic data up to a first frequency threshold and assuming the seismic data is free of attenuation effects; extracting geobodies from the updated model; obtaining a Q model using the geobodies; and updating the physical property model using an inversion process, wherein the Q model is incorporated into the inversion process. These steps may be repeated until a second predetermined resolution of the physical property model is achieved, wherein the first frequency threshold is progressively increased in each repetition. The Q model may be updated with seismic data at all
(Continued)

available frequencies to obtain a full-band Q model; and the physical property model may be updated using full-band migration and the full-band Q model.

25 Claims, 6 Drawing Sheets

(52) U.S. Cl.
CPC ...... *G01V 2210/51* (2013.01); *G01V 2210/66* (2013.01)

(56) References Cited

U.S. PATENT DOCUMENTS

| | | | | |
|---|---|---|---|---|
| 2015/0293246 | A1* | 10/2015 | Dickens | G01V 1/307 702/18 |
| 2015/0362622 | A1 | 12/2015 | Denli et al. | |
| 2016/0131781 | A1* | 5/2016 | Sun | G01V 1/282 367/7 |
| 2017/0097428 | A1* | 4/2017 | Sun | G01V 1/362 |
| 2018/0017690 | A1* | 1/2018 | Tan | G01V 1/303 |
| 2019/0302292 | A1* | 10/2019 | Xie | G01V 1/303 |

OTHER PUBLICATIONS

Cheng X, et al. (2015) "A New Approach of Visco-Acoustic Waveform Inversion in the Time Domain." *SEG Technical Program Expanded Abstracts*, vol. 34, pp. 1183-1187.

Hu, W, et al. (2011) "A Robust and Accurate Seismic Attenuation Tomography Algorithm." *SEG Technical Program Expanded Abstracts*, vol. 30, pp. 2727-2731.

Stopin, A, et al. (2016) "Application of Visco-Acoustic Full Waveform Inversion for Gas Cloud Imaging and Velocity Model Building." *78th Annual International Conference and Exhibition, EAGE, Extended Abstracts*, Tu STZO 12, https://doi.org/10.3997/2214-4609.201600865. pp. 1-5.

Wang, Yanghua. (2009) "Seismic Inverse Q Filtering." *John Wiley & Sons*, pp. 27-28.

Zhou J, et al. "FWI-Guided Q Tomography and Q-PSDM for Imaging in the Presence of Complex Gas Clouds, a Case Study from Offshore Malaysia." *SEG Technical Program Expanded Abstracts*, vol. 32, 2013, pp. 4765-4769.

\* cited by examiner

ACCURATE VELOCITY MODEL ESTIMATION AND IMAGING IN THE PRESENCE OF LOCALIZED ATTENUATION (Q) ANOMALIES

CROSS-REFERENCE TO RELATED APPLICATION

This application claims the benefit of U.S. Provisional Patent Application 62/746,601 filed Oct. 17, 2018 entitled ACCURATE VELOCITY MODEL ESTIMATION AND IMAGING IN THE PRESENCE OF LOCALIZED ATTENUATION (Q) ANOMALIES, the entirety of which is incorporated by reference herein.

TECHNOLOGICAL FIELD

The present disclosure relates to the field of geophysical prospecting, including prospecting for hydrocarbons, and more particularly, to seismic data processing through imaging and inversion of seismic data. Specifically, aspects of the present disclosure relate to methods for inferring properties of the subsurface taking into account localized attenuation (Q) anomalies.

BACKGROUND

This section is intended to introduce various aspects of the art, which may be associated with the present disclosure. This discussion is intended to provide a framework to facilitate a better understanding of particular aspects of the present disclosure. Accordingly, it should be understood that this section should be read in this light, and not necessarily as an admission of prior art.

An important goal of seismic prospecting is to accurately image subsurface structures or formations. Seismic prospecting is facilitated by obtaining raw seismic data from a seismic survey, which involves generating seismic energy at ground or sea level by, for example, a controlled explosion (or other form of source, such as vibrators), and delivering it to the earth. Seismic waves that penetrate the earth are reflected from underground structures and are received by a number of sensors/receivers at ground or sea level, such as geophones. The measured waves (also referred to as "shot records") may be recorded at multiple locations by moving the source and receivers to different locations until an acceptable area has been surveyed to create an accurate mapping of the subsurface environment. The processed data is then examined with a goal of identifying geological formations that may contain hydrocarbons (e.g., oil and/or natural gas) based on inferred subsurface properties indicative of such geological formations, such as the velocity with which sound waves propagate.

Inferring subsurface properties from seismic survey data can be done using a variety of techniques. For example, ray-based techniques attempt to model subsurface properties using data traveltimes from a number of source and receiver locations. Migrated gathers (offset or angle gathers) are used for updating a model of the subsurface properties, and the flatness of the gathers (which is measured by the depth differences of the same reflection event in the different traces of a gather) is used to extract information about whether the model is accurate. Those depth differences, also known as residual depth errors, are a measure of relative depth errors of the same reflection event in different traces of a gather. The model may be iteratively perturbed, with the objective of minimizing the residual depth errors to optimize the model. In this context, a model could be a velocity model or a model of any other physical property of the subsurface, and refers to an array of numbers, typically a three-dimensional array, where each number, which may be called a model parameter, is a value (e.g. velocity or another physical property) in a cell, and where a subsurface formation has been conceptually divided into discrete cells for computational purposes. Non-limiting examples of such physical properties or model parameters include P-wave impedance $I_P$, S-wave impedance $I_S$, P-wave velocity $V_P$, S-wave velocity $V_S$, P-wave velocity divided by S-wave velocity $(V_P/V_S)$, S-wave velocity divided by P-wave velocity $(V_S/V_P)$, density $\rho$, $\lambda$ (lambda), and $\mu$ (mu).

Full Wavefield Inversion (FWI) is another approach to seismic data analysis and imaging that seeks to model earth parameters using amplitude and phase information from seismic waveforms, not only traveltimes as tomographic techniques. Specifically, FWI estimates a velocity model or a model of any other subsurface property by minimizing the phase and amplitude mismatch between simulated and observed data. For example, a typical FWI algorithm may be generally described as follows: using a starting subsurface physical property model, synthetic seismic data are generated, i.e., modeled or simulated, by solving a wave equation using a numerical scheme (e.g., finite-difference, finite-element, etc.). The synthetic data are compared with the observed seismic data and using the difference between the two, an error or objective function is calculated (the objective function is a measure of the misfit between the simulated and observed data). Using the objective function, a modified subsurface model is generated which is used to simulate a new set of synthetic seismic data. This new set of synthetic seismic data is compared with the field data to generate a new objective function. This process is repeated until the objective function is satisfactorily minimized and the final subsurface model is generated. Earth parameters may be reconstructed individually by single-parameter FWI or simultaneously by multi-parameter FWI.

A global or local optimization method may be used to minimize the objective function and to update the subsurface model. For example, a local cost function optimization procedure for FWI may involve (1) selecting a starting model; (2) computing a search direction; and (3) searching for an updated model that is a perturbation of the model in the search direction. The cost function optimization procedure may be iterated by using the new updated model as the starting model for finding another search direction, which may then be used to perturb the model in order to better explain the observed data. The process may continue until an updated model is found that satisfactorily explains the observed data. Commonly used local cost function optimization methods include gradient search, conjugate gradients, quasi Newton, Gauss-Newton and Newton's method. Commonly used global methods include Monte Carlo or grid search.

Both FWI and tomography are iterative processes, each iteration comprising the steps of forward modeling to create simulated (model) data and objective function computation to measure the similarity between simulated and field data. Physical properties of the subsurface are adjusted at each iteration to ensure progressively better agreement between simulated and field data. However, compared to tomography, FWI generally provides considerably higher resolution because it uses both amplitude and traveltime information.

Regardless of which approach for seismic data analysis and imaging is used, its implementation should account for the presence of gas pockets in the subsurface, which may cause localized changes in elastic properties that may affect the propagation of sound waves, whose speed typically varies significantly depending on frequency (i.e., dispersion). In addition, analysis techniques should account for the loss of energy acoustic waves may experience as they propagate through the subsurface due to absorption by the propagation medium (i.e., attenuation). Attenuation limits resolution of seismic data because it causes both amplitude decay, particularly at high frequencies, and phase delay, typically at low frequencies.

A number of theories have been proposed to quantitatively describe the effects of dispersion and attenuation on the speed of sound. For example, dispersion may be controlled by the reference frequency (also referred to as "tuning constant") and the absorptive property of a medium, the latter of which may be quantified by a quality factor "Q" that decreases in value as the medium becomes more absorptive. See Wang (2009). By setting the reference frequency to the upper limit of the possible seismic band, the dispersion effect may manifest as follows: the lower the frequency, the slower the waves propagate. Amplitudes are affected as well, but in an opposite manner: the higher the frequency, the stronger wavefield amplitudes are attenuated (irrespective of the reference frequency).

The combination of dispersion and attenuation creates a number of problems for model building and imaging, regardless of which technique is used to infer subsurface properties. For example, it is often difficult to distinguish between the slowdown effects caused by velocity variations and those due to the dispersive effects associated with Q anomalies, especially in narrow-band data. As another example, amplitude attenuation may complicate the creation of coherent image below bodies with low Q (corresponding to stronger attenuation and dispersion). Because of suboptimal imaging, it is often difficult to create a precise outline of the Q anomalies, in turn complicating estimation of the Q values.

Conventional approaches to seismic data analysis and imaging in the presence of localized Q anomalies typically rely on ray-based methods for model building combined with ray- or wave-equation-based techniques for imaging. Usually, the presumed Q bodies are identified in images (created without taking attenuation into account) and the value of Q may be estimated through Q tomography or by semi-manual adjustment, so that amplitudes and/or spectra of the reflectors directly below the attenuation anomaly match those immediately adjacent to the problematic area, but unaffected by attenuation.

One downside of such conventional approaches is that identification of attenuating zones using migrated images is labor-intensive and prone to errors. Additionally, incorporating FWI into the process may not be straightforward in part because FWI for velocity model building is generally performed at low frequencies (sufficient to obtain a background velocity update) where Q effects on velocity are strongest, while imaging is done with higher-frequency data (where velocities are less affected by attenuation) in order to achieve the best possible image resolution. Without taking attenuation (background or local) into account, the inverted velocity obtained from FWI may be too slow for imaging. For example, in pre-stack depth migration (PSDM), inaccurate velocity may lead to curved image gathers and distorted images.

To address the labor-intensiveness and error tendencies in conventional approaches, Zhou et al. (2013) have proposed to apply FWI-guided Q tomography. In this approach, FWI is applied without accounting for Q effects, and the resulting (relatively) high-resolution inverted models are used to identify attenuation zones by examining where inverted velocities are abnormally low. This allows for a more accurate and automated delineation of Q bodies and, therefore, more accurate Q estimation compared to conventional techniques. However, the resulting combination of velocity and attenuation models cannot be used directly for imaging because the velocity model was derived without taking attenuation into account and may therefore be too slow. Cheng et al. (2015) go a step further and incorporate a constant background Q model in FWI. But because spatially varying attenuation anomalies (which locally have strong effect on wave propagation) are not taken into account, the resulting velocity-attenuation combination is still inappropriate for imaging. Accordingly, a need exists for methods for seismic data analysis and imaging that satisfactorily address dispersion and attenuation effects.

SUMMARY

Aspects of the technological advancement described herein include methods for inversion of seismic data to update a physical property model. Proposed methods improve conventional model building and imaging techniques where Q anomalies are present by incorporating Q-estimation processes to refine the velocity or other physical property models derived using FWI, thereby increasing consistency with a Q model. Accuracy may further be increased by implementing frequency continuation (i.e., progressively increasing frequency) in an iterative process that updates both the physical property and Q models. In addition, disclosed methods improve conventional model building techniques by accounting for Q anomalies during FWI, thus producing more accurate inverted models which can be used for imaging.

The present disclosure provides methods for inversion of seismic data to update a physical property model of subsurface velocity or other physical property. Such methods may comprise iteratively updating the physical property model until a first predetermined resolution of the physical property model is achieved, wherein the updating is performed using full wavefield inversion of the seismic data up to a first frequency threshold and assuming the seismic data is free of attenuation effects; extracting geobodies from the updated physical property model; obtaining a Q model using the geobodies; and updating the physical property model using an inversion process, wherein the Q model is incorporated into the inversion process. Extracting geobodies may comprise identifying regions in the physical property model exhibiting physical property values indicative of attenuation effects.

According to certain aspects of the present disclosure, methods may further comprise repeating the above steps until a second predetermined resolution of the physical property model is achieved, wherein the first frequency threshold is progressively increased in each repetition. Optionally, the physical property model may be updated using ray-based tomography and the Q model before repeating the steps. The method may also comprise updating the Q model with seismic data at all available frequencies to obtain a full-band Q model; and updating the physical property model to obtain a final physical property model, wherein the updating is performed using full-band migration and the full-band Q model.

According to certain other aspects of the present disclosure, methods may comprise updating the physical property model using viscoacoustic full wavefield inversion, and further updating the physical property model using ray-based tomography and the Q model. Extracting geobodies, obtaining a Q model using the geobodies, and updating the physical property model may be repeated until a second predetermined resolution of the physical property model is achieved, wherein the viscoacoustic full wavefield inversion is performed up to a second frequency threshold that is progressively increased in each repetition. Then the Q model may be updated with seismic data at all available frequencies to obtain a full-band Q model; and the physical property model updated one more time to obtain a final physical property model, wherein the updating is performed using full-band migration and the full-band Q model.

The foregoing has broadly outlined the features of the present disclosure so that the detailed description that follows may be better understood. Additional features will also be described herein.

BRIEF DESCRIPTION OF THE DRAWINGS

These and other features, aspects and advantages of the disclosure will become apparent from the following description, appending claims and the accompanying drawings, which are briefly described below.

It should be noted that the figures are merely examples and no limitations on the scope of the present disclosure are intended thereby. Further, the figures are generally not drawn to scale, but are drafted for purposes of convenience and clarity in illustrating various aspects of the disclosure. Certain features and components therein may be shown exaggerated in scale or in schematic form and some details of conventional elements may not be shown in the interest of clarity and conciseness. When describing a figure, the same reference numerals may be referenced in multiple figures for the sake of simplicity.

DETAILED DESCRIPTION

To promote an understanding of the principles of the disclosure, reference will now be made to the features illustrated in the drawings and no limitation of the scope of the disclosure is hereby intended by specific language. Any alterations and further modifications, and any further applications of the principles of the disclosure as described herein, are contemplated as would normally occur to one skilled in the art to which the disclosure relates.

Figure 1:
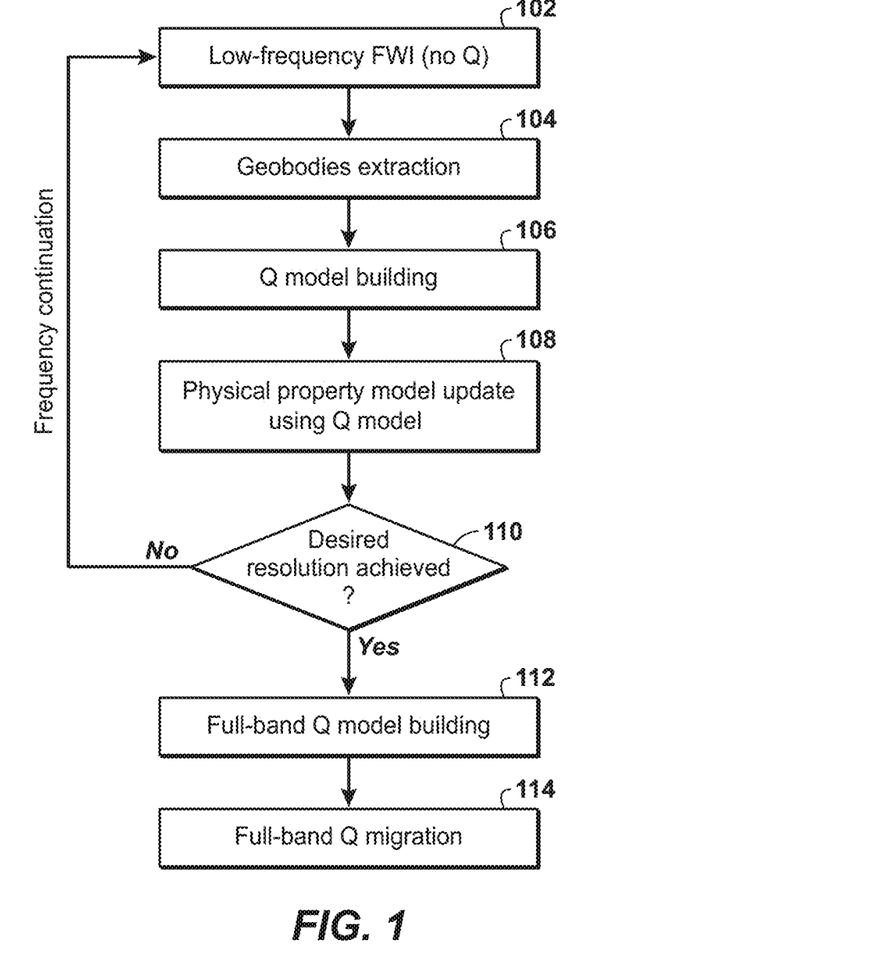
FIG. 1 is a flowchart of methods according to certain aspects of the present disclosure.

With reference to FIG. 1, inversion methods according to the present disclosure may begin at step 102 by iteratively updating a model of a physical property of the subsurface until a first predetermined resolution of the physical property model is achieved. The model could be a velocity model (e.g. $V_P$, $V_S$, $V_P/V_S$, or $V_S/V_P$) or some other physical property (e.g. $\rho$, $\lambda$, or $\mu$). The physical property model may be updated using FWI up to a frequency threshold sufficient to extract geobodies from the model (i.e., until resolution of the model is sufficient to identify geobodies based on the model), such as 6 Hz or some other acceptable frequency threshold. In this step, FWI may be performed assuming the seismic data is free of attenuation (Q) effects and it may be acoustic or elastic FWI.

Next, at step 104, geobodies may be extracted from the physical property model. For example, in the case of a velocity model, the model may be analyzed visually or by computational methods to identify low velocity zones (i.e. coordinates with values below a pre-defined velocity threshold or meeting some other criteria) that reflect potential attenuation anomalies. These attenuation anomalies may be visualized in a 3D array as geobodies—areas of geological attributes corresponding to increased attenuation in the medium. As an example, geobodies may be extracted by searching an array of values in a velocity model to see if a value is below a certain threshold. If so, corresponding values in the geobody model may be set to 1, for example, and otherwise to 0. Appropriate threshold values may be selected by scanning candidate values and selecting a threshold that generates the most geologically consistent geobody shape, or another validation criteria.

Following the identification of geobodies, at step 106, a Q model may be built using the geobodies. For example, an attenuation-estimation algorithm may be employed to construct an array of attenuation values (e.g. amplitude and/or phase changes) corresponding to attributes of the geobodies extracted from the physical property model. Examples of attenuation-estimation algorithms include Q tomography and other seismic-attenuation-tomography algorithms, for example, as described in Hu et al. (2011).

Once a Q model has been obtained, the velocity or other physical property model may be updated, at step 108, using the Q model. Specifically, an inversion process incorporating the Q model may be employed to update the physical property model. For example, velocity values in a velocity model may be adjusted using tomography taking into account the attenuation anomalies reflected in the Q model. Specifically, the Q model may be incorporated into a Q migration algorithm which generates common-image gathers. Residual moveout curvature may then be estimated from the gathers and incorporated into Q tomography as input data. One advantage of incorporating the Q model into Q migration is that gathers in gas-affected areas are better imaged, allowing for better residual moveout picks for the tomography update.

At step 110, if the desired resolution of extracted geobodies and inverted physical property model has not been achieved, the above process may be repeated at progressively higher frequencies until the desired resolution of extracted geobodies and inverted physical property model is obtained. That is, FWI assuming no Q effects may be performed on seismic data up to a higher frequency threshold than the previous iteration to update the velocity or other property model. From the updated model, geobodies may be extracted again (likely at improved resolution) to build a Q model (likely also more refined than the earlier iteration) to use in an inversion process to further update the velocity or other property model. The inversion process may be ray-based tomography (e.g., Hu et al. (2011)) or a wave-equation-based algorithm such as wave-equation migration velocity analysis (Biondi et al. (1999)). This iterative sequence may be repeated until resolution of the Q model and physical property model stabilizes or otherwise reaches acceptable levels. Typically, this is observed at frequencies up to about 10 to 15 Hz.

Once acceptable resolution has been achieved after one or more iterations, at step 112 the Q model may be updated using seismic data in the full frequency spectrum to obtain a full-bandwidth or "full-band" Q model. The process is analogous to step 106, but using full-bandwidth data instead of low-frequency data. A full-band Q model is appropriate to compensate amplitude loss and phase delay for full-band Q migration.

Finally, at step 114, the physical property model may be updated one more time using full-band Q migration (i.e. full-band migration incorporating the full-band Q model) to obtain a final physical property model. Full-band migration refers to an imaging algorithm which maps reflected energy in the surface seismic record into a proper location of subsurface reflectors using the entire frequency bandwidth of the seismic record. The final property model may be delivered to a geologist to interpret detailed subsurface geological structures. The final model may be used to generate an image of the subsurface using known methods, or the model or the image may be used to prospect for hydrocarbons or otherwise be used in hydrocarbon management. As used herein, hydrocarbon management includes hydrocarbon extraction, hydrocarbon production, hydrocarbon exploration, identifying potential hydrocarbon-bearing formations, characterizing hydrocarbon-bearing formations, identifying well locations, determining well injection rates, determining well extraction rates, identifying reservoir connectivity, acquiring, disposing of and/or abandoning hydrocarbon resources, reviewing prior hydrocarbon management decisions, and any other hydrocarbon-related acts or activities. For, example, prospecting can include causing a well to be drilled that targets a hydrocarbon deposit derived from a subsurface image generated from the updated physical property model or subsurface image.

Figure 2:
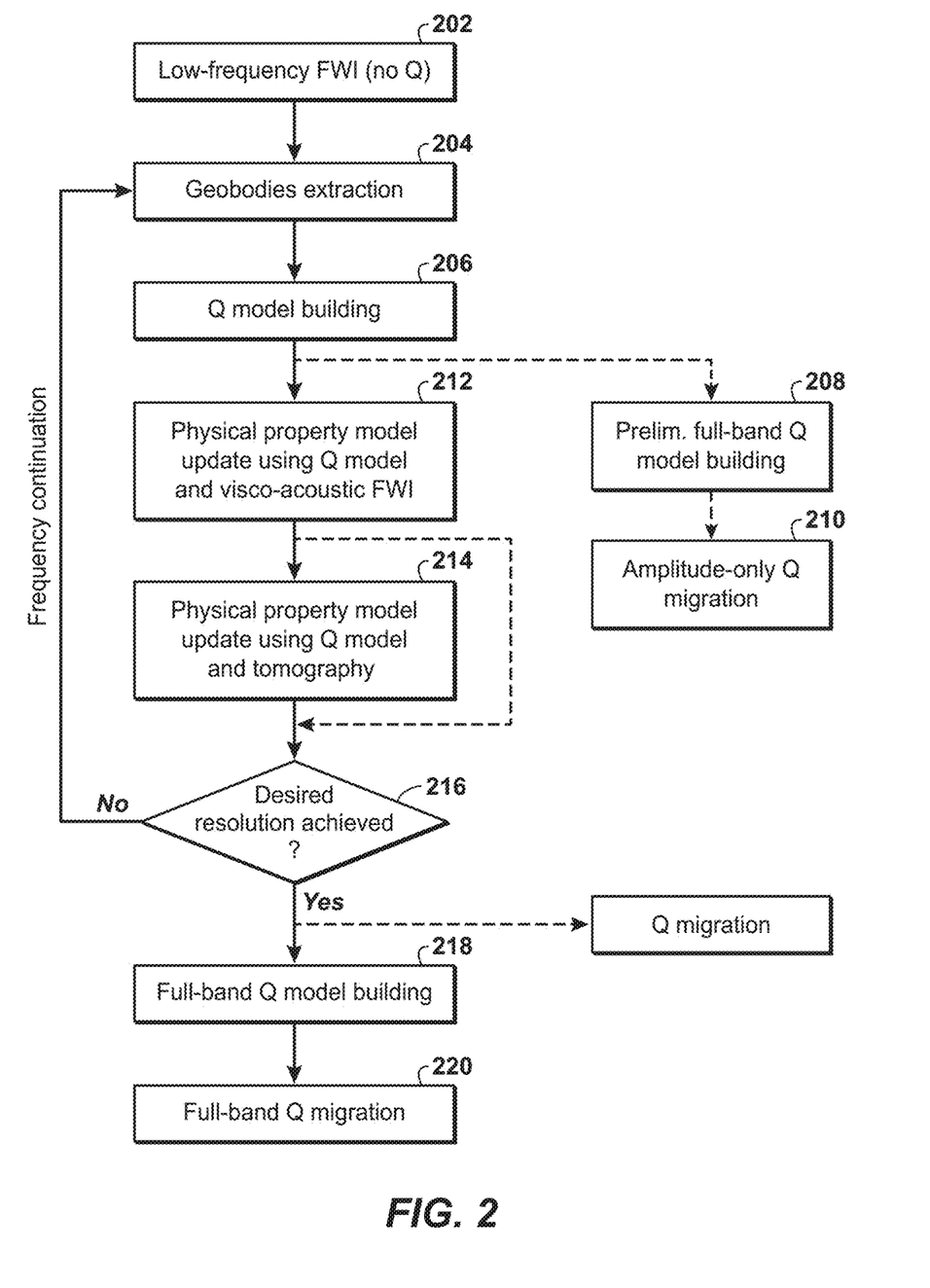
FIG. 2 is a second flowchart of methods according to certain aspects of the present disclosure.

Alternatively or additionally, methods according to the technological advancement described herein may incorporate Q effects into viscoacoustic FWI to increase the fidelity of the inverted model (e.g. velocity) and attenuation models further. With reference to FIG. 2, such methods may begin, at step 202, by iteratively updating a model of a physical property of the subsurface until a first predetermined resolution of the physical property model is achieved as described above with reference to step 102. The physical property model may be updated using FWI (assuming the seismic data is free of attenuation effects) up to a frequency threshold sufficient to extract geobodies from the model, such as 6 Hz or some other acceptable frequency threshold. Then, at step 204, geobodies may be extracted from the physical property model, which may be used to build a Q model at step 206 (similar to steps 104 and 106).

Optionally, at this point the resulting Q model may be adjusted further at step 208 using seismic data in the full frequency spectrum to obtain a preliminary full-band Q model for purposes of full-band imaging. The preliminary full-band Q model may be used, at step 210, for "amplitude-only" Q migration since kinematic effects will have been accounted for in the velocity model. Amplitude-only Q migration refers to an imaging algorithm which compensates amplitudes of reflected events for losses incurred during propagation due to attenuation, but does not alter the kinematics (phases) of these reflections. Advantages of obtaining a preliminary full-band Q model for amplitude-only Q migration include providing an image of the subsurface with improved (more continuous) reflector amplitudes (even though reflector positioning and focusing may be sub-optimal since kinematic effects of Q have not been accounted for at this stage), allowing interpreters to perform preliminary hydrocarbon identification. For example, in early stages of hydrocarbon identification, a relatively reliable stack image without wipe-out zones may be sufficiently reliable to identify potential hydrocarbon locations. Slight errors in location due to kinematic error from phase error would have relatively low impact in decision-making.

The Q model obtained in step 206 may also be used in viscoacoustic FWI at step 212 to update the physical property model. Here, however, since viscoacoustic FWI is usually performed for relatively low frequencies (<15 Hz), it may be beneficial to ensure that the Q model is estimated in step 206 using the same frequency band as the viscoacoustic FWI step 212 to ensure consistency between imaging and inversion. Viscoacoustic FWI refers to a variant of FWI which accounts for the effects of attenuation in the modeling stage (both during forward modeling and back-propagation of the residual). For example, viscoacoustic FWI may be implemented according to methods described in Denli (2015), incorporated in its entirety herein by reference, by formulating viscoacoustic wave equations using auxiliary state variables which are a combination of pressure and memory variables, to reduce computational complexity. One form of viscoacoustic wave equation is the first-order conventional viscoacoustic wave equations as a pressure-velocity-memory system:

$$\frac{\partial p}{\partial t} + k\nabla \cdot v + r = 0 \quad \text{(Eq. 1)}$$

$$\frac{\partial v}{\partial t} + \frac{1}{\rho}\nabla p = s_v \quad \text{(Eq. 2)}$$

$$\frac{\partial \zeta_l}{\partial t} - \phi_l(p - \zeta_l) + r = 0 \quad \text{(Eq. 3)}$$

$$r - \sum_{l=1}^{L} \alpha_l \phi_l(p - \zeta_l) + s_p = 0 \quad \text{(Eq. 4)}$$

where r is a new variable which is defined for clarity and is not marching in time; $\zeta_l = p - m_l/a_l$; and $l=1, 2, \ldots L$; L is the number of memory variables; p and v are pressure and velocity vector respectively; $m_l$ is the $l^{th}$ memory variable; $s_p$ and $s_v$ are pressure source and velocity source vector respectively; $\partial/\partial t$ is the time-derivative operator; $\nabla$ is a gradient operator which accepts a scalar variable; $\nabla\bullet$ is a divergence operator which accepts a vector variable; $\kappa$ and $\rho$ are bulk modulus and density respectively; $\phi_l$ is the $l^{th}$ relaxation frequency; $a_l$ is the $l^{th}$ relaxation modulus. The relaxation frequencies and moduli are computed using a Generalized-Maxwell rheological model for given quality factor Q. The multiplicative inverse of the quality factor is defined in the frequency domain $\omega$ as:

$$Q^{-1}(\omega) = \sum_{l=1}^{L} \alpha_l \frac{\phi_l \omega + \phi_l^2 Q^{-1}}{\phi_l^2 + \omega^2} \quad \text{(Eq. 5)}$$

By incorporating the Q model into viscoacoustic FWI, an improved physical property model may be obtained that more accurately takes into account attenuation effects.

Optionally, at step 214, the physical property model may be further refined using another inversion scheme such as ray-based tomography.

At step 216, this process may be repeated at progressively higher frequencies until the desired resolution of extracted geobodies and inverted physical property model is achieved. (It should be understood that it does not have to be repeated if the desired resolution is achieved in the first iteration.) This means, for example, adjusting or refining the geobodies obtained in step 204 based on the updated physical property model obtained in steps 212 or 214, and then running the FWI step 212 using progressively higher frequencies. Having achieved acceptable resolution, the physical property model may be used directly in migration. Alternatively, at step 218 the Q model may be updated in using seismic data in the full frequency spectrum to obtain a full-bandwidth or "full-band" Q model, similar to step 112. Finally, at step 220, the physical property model may be updated one more time using full-band Q migration to obtain a final physical property model.

Figure 3A:
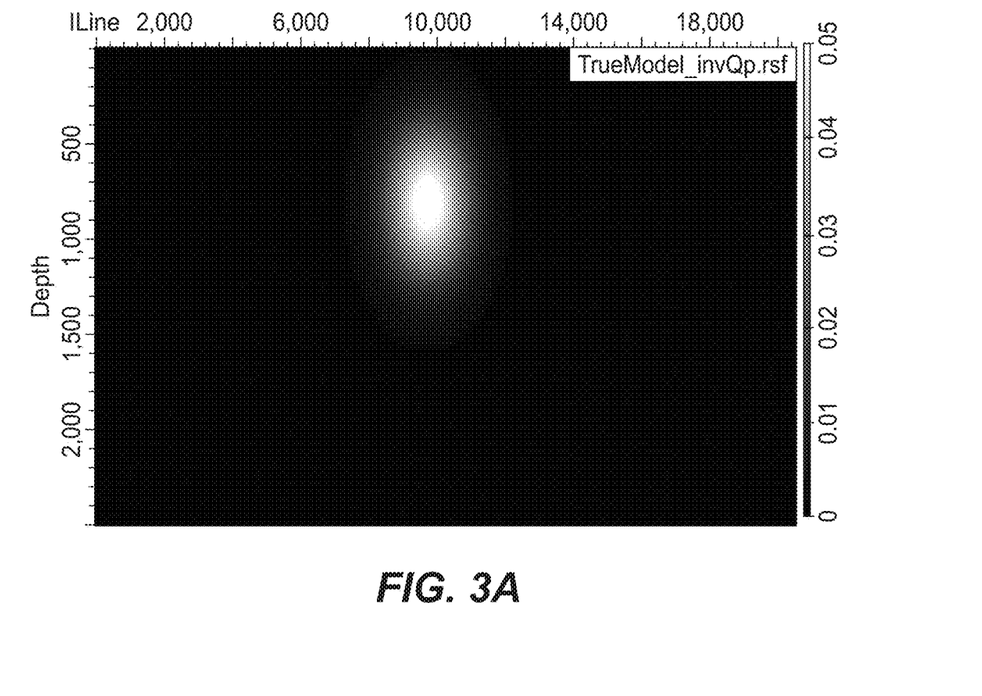
FIG. 3A shows an exemplary Q model.
Figure 3B:
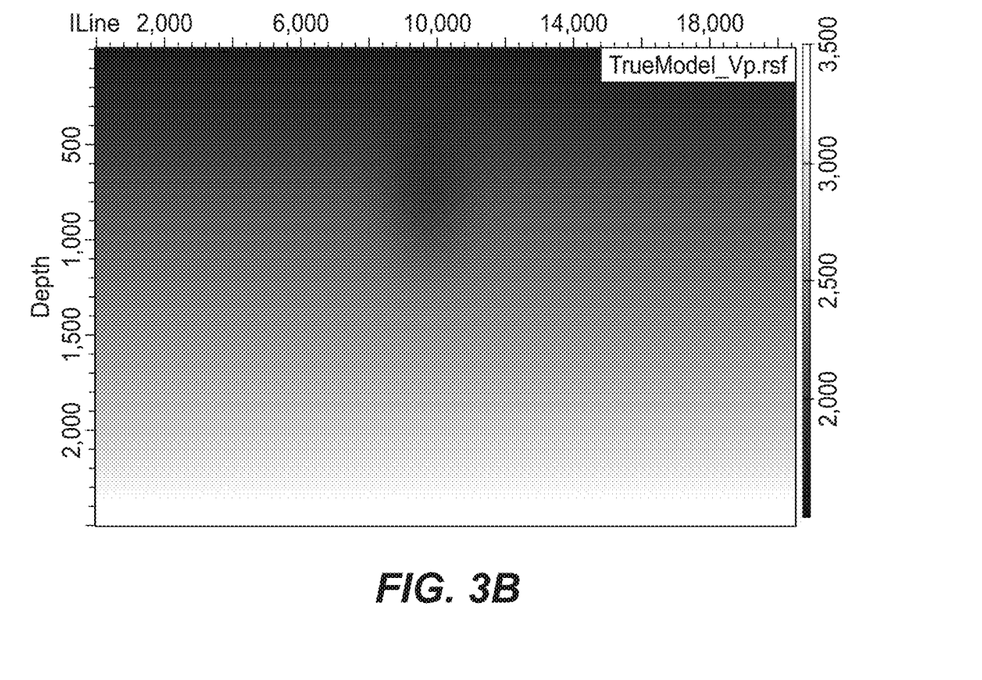
FIG. 3B shows an exemplary "true" velocity model.
Figure 3C:
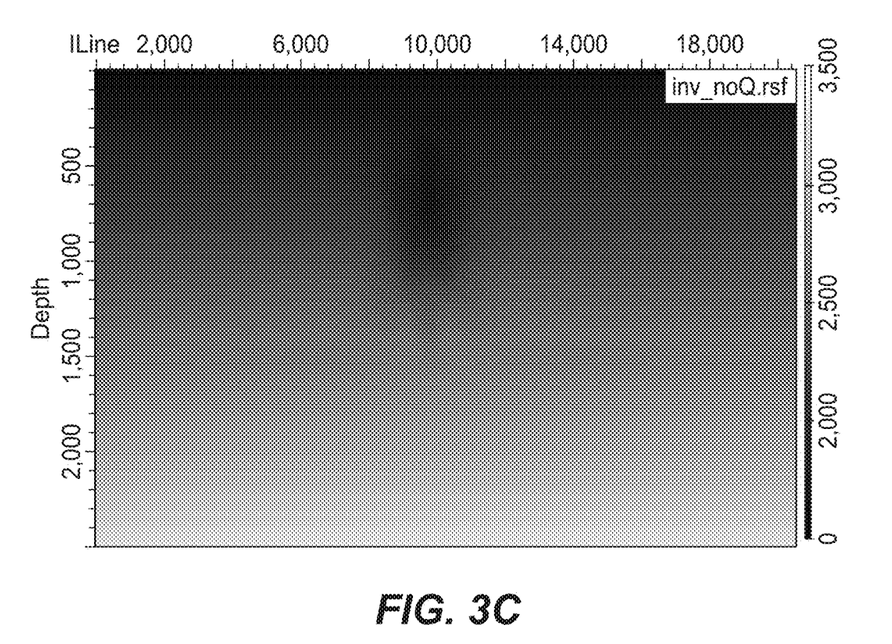
FIG. 3C shows an exemplary inverted velocity model obtained using conventional FWI methods.
Figure 3D:
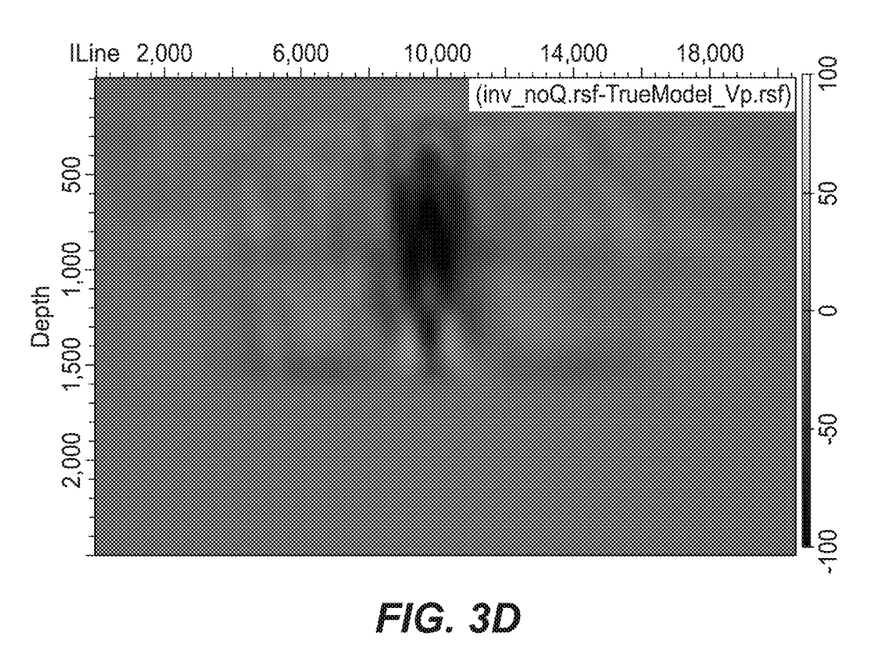
FIG. 3D shows the difference between the inverted and true models of FIGS. 3C and 3B.

To illustrate exemplary benefits of the methods described herein, a comparison between inverted velocity models obtained using conventional methods and methods according to aspects of the present disclosure is provided in FIGS. 3A-3F. In particular, FIG. 3A illustrates an exemplary "true" Q model built for purposes of the comparison. This model represents a single, oval-shaped anomaly in the region of interest. The "true" velocity model is shown in FIG. 3B, which reflects the same oval-shaped anomaly in a smooth background. Simulated seismic data was generated using the true Q model (FIG. 3A) and the true velocity model (FIG. 3B), using a Ricker wavelet as source wavelet, with a peak frequency of 5 Hz. The simulated seismic data is intended to mimic data acquired in the field. Using the simulated seismic data and conventional FWI, an inverted velocity model was obtained as shown in FIG. 3C. The difference between the inverted velocity model and the true velocity model is shown in FIG. 3D.

Figure 3E:
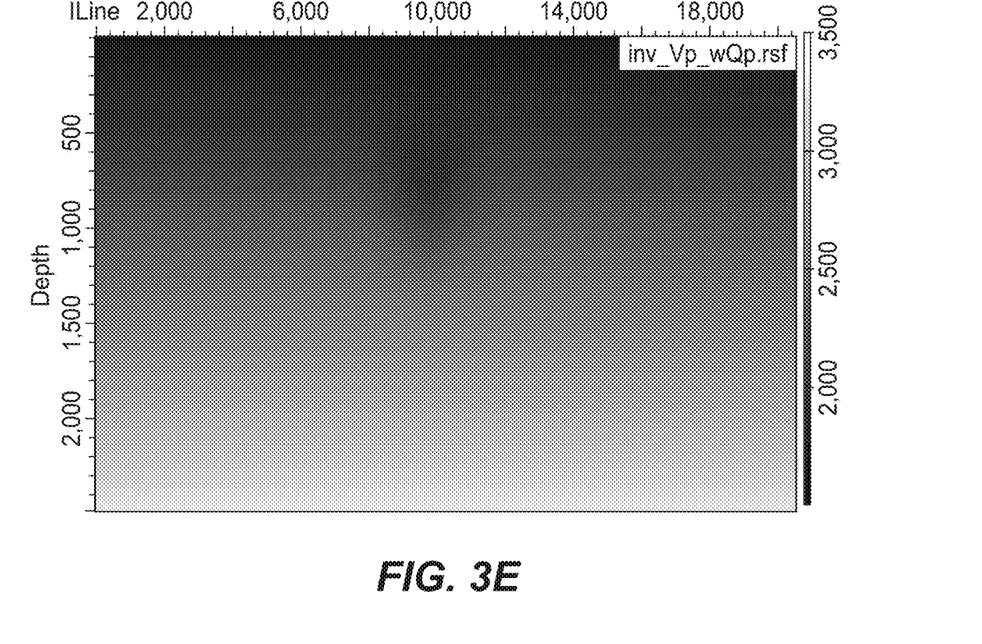
FIG. 3E shows an exemplary inverted velocity model obtained using methods according to certain aspects of the present disclosure.
Figure 3F:
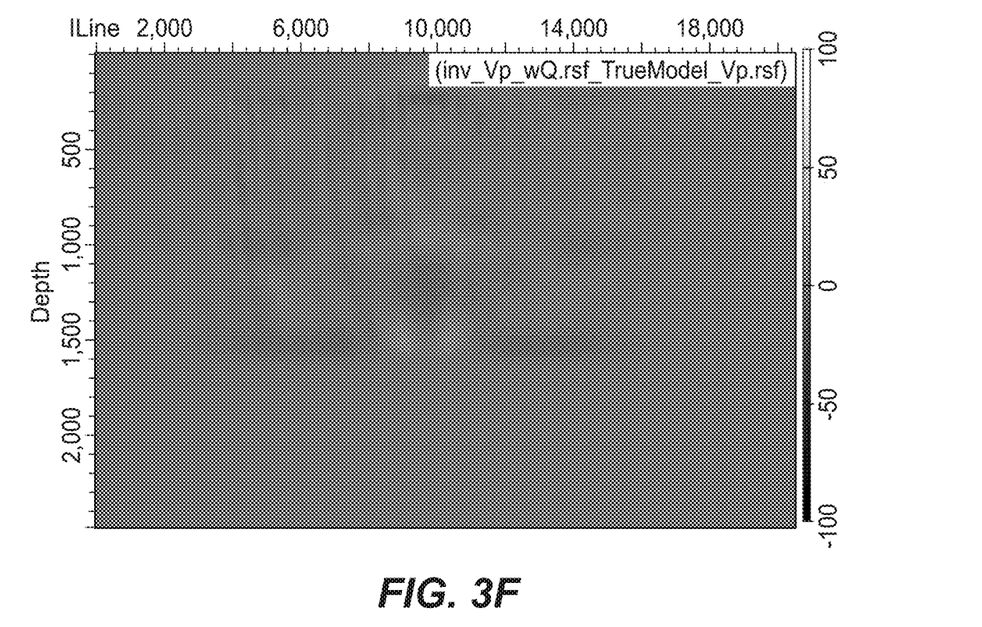
FIG. 3F shows the difference between the inverted and true models of FIGS. 3E and 3B.

In contrast, FIG. 3E shows the inverted velocity model obtained using methods described herein. Specifically, an approach according to FIG. 2 was employed where the Q model was based on the true Q model to illustrate maximum potential benefits assuming the estimated Q model is error-free. The difference between the inverted velocity model in FIG. 3E and the "true" velocity model in FIG. 3B is shown in FIG. 3F. A comparison of FIG. 3D and FIG. 3F confirms that the inverted velocity model obtained according to methods described herein provides an answer much closer to the true answer (less contrast indicates difference between models is closer to zero).

Figure 4:
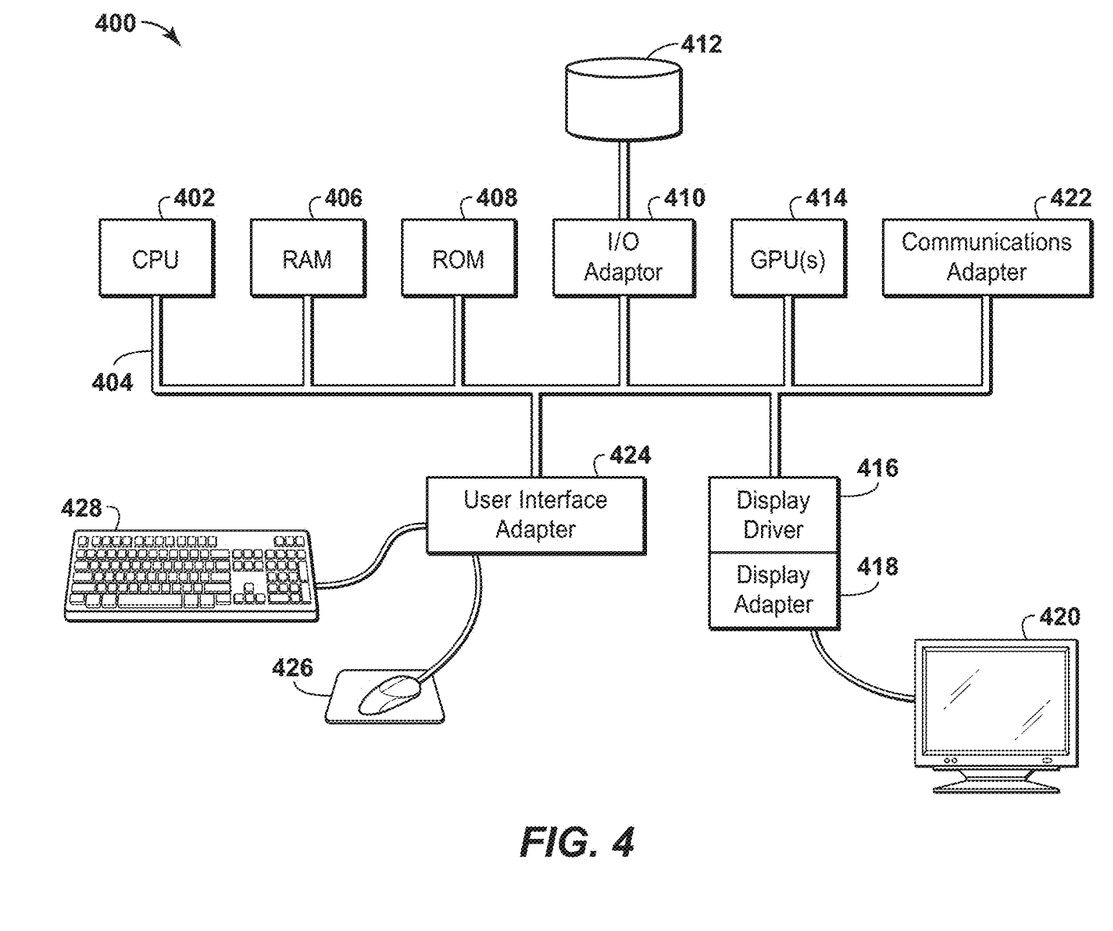
FIG. 4 is a diagram of an exemplary computer system that may be utilized to implement aspects of the present disclosure.

In all practical applications, the present technological advancement must be used in conjunction with a computer, programmed in accordance with the disclosures herein. For example, FIG. 4 is a diagram of an exemplary computer system 400 that may be utilized to implement methods described herein. A central processing unit (CPU) 402 is coupled to system bus 404. The CPU 402 may be any general-purpose CPU, although other types of architectures of CPU 402 (or other components of exemplary system 400) may be used as long as CPU 402 (and other components of system 400) supports the operations as described herein. Those of ordinary skill in the art will appreciate that, while only a single CPU 402 is shown in FIG. 4, additional CPUs may be present. Moreover, the computer system 400 may comprise a networked, multi-processor computer system that may include a hybrid parallel CPU/GPU system. The CPU 402 may execute the various logical instructions according to various teachings disclosed herein. For example, the CPU 402 may execute machine-level instructions for performing processing according to the operational flow described.

The computer system 400 may also include computer components such as non-transitory, computer-readable media. Examples of computer-readable media include a random access memory (RAM) 406, which may be SRAM, DRAM, SDRAM, or the like. The computer system 400 may also include additional non-transitory, computer-readable media such as a read-only memory (ROM) 408, which may be PROM, EPROM, EEPROM, or the like. RAM 406 and ROM 408 hold user and system data and programs, as is known in the art. The computer system 400 may also include an input/output (I/O) adapter 410, a graphics processing unit (GPU) 414, a communications adapter 422, a user interface adapter 424, a display driver 416, and a display adapter 418.

The I/O adapter 410 may connect additional non-transitory, computer-readable media such as a storage device(s) 412, including, for example, a hard drive, a compact disc (CD) drive, a floppy disk drive, a tape drive, and the like to computer system 400. The storage device(s) may be used when RAM 406 is insufficient for the memory requirements associated with storing data for operations of the present techniques. The data storage of the computer system 400 may be used for storing information and/or other data used or generated as disclosed herein. For example, storage device(s) 412 may be used to store configuration information or additional plug-ins in accordance with the present techniques. Further, user interface adapter 424 couples user input devices, such as a keyboard 428, a pointing device 426 and/or output devices to the computer system 400. The display adapter 418 is driven by the CPU 402 to control the display on a display device 420 to, for example, present information to the user such as subsurface images generated according to methods described herein.

The architecture of system 400 may be varied as desired. For example, any suitable processor-based device may be used, including without limitation personal computers, laptop computers, computer workstations, and multi-processor servers. Moreover, the present technological advancement may be implemented on application specific integrated circuits (ASICs) or very large scale integrated (VLSI) circuits. In fact, persons of ordinary skill in the art may use any number of suitable hardware structures capable of executing logical operations according to the present technological advancement. The term "processing circuit" encompasses a hardware processor (such as those found in the hardware devices noted above), ASICs, and VLSI circuits. Input data to the computer system 400 may include various plug-ins and library files. Input data may additionally include configuration information.

Preferably, the computer is a high performance computer (HPC), known as to those skilled in the art. Such high performance computers typically involve clusters of nodes, each node having multiple CPU's and computer memory that allow parallel computation. The models may be visualized and edited using any interactive visualization programs and associated hardware, such as monitors and projectors. The architecture of system may vary and may be composed of any number of suitable hardware structures capable of executing logical operations and displaying the output according to the present technological advancement. Those of ordinary skill in the art are aware of suitable supercomputers available from Cray or IBM.

Disclosed aspects may include any combinations of the methods and systems shown in the following numbered paragraphs. This is not to be considered a complete listing of all possible aspects, as any number of variations can be envisioned from the description above.

It should be understood that the numerous changes, modifications, and alternatives to the preceding disclosure can be made without departing from the scope of the disclosure. The preceding description, therefore, is not meant to limit the scope of the disclosure. Rather, the scope of the disclosure is to be determined only by the appended claims and their equivalents. It is also contemplated that structures and features in the present examples can be altered, rearranged, substituted, deleted, duplicated, combined, or added to each other.

REFERENCES

The following references are incorporated herein in their entirety in all jurisdictions that allow it:

Cheng X, et al. "A New Approach of Visco-Acoustic Waveform Inversion in the Time Domain." *SEG Technical Program Expanded Abstracts*, vol. 34, 2015, pp. 1183-1187.

Stopin, A, et al. "Application of Visco-Acoustic Full Waveform Inversion for Gas Cloud Imaging and Velocity Model Building." 78*th Annual International Conference and Exhibition, EAGE, Extended Abstracts*, Tu STZ0 12, https://doi.org/10.3997/2214-4609.201600865.

Wang, Yanghua. "Seismic Inverse Q Filtering." John Wiley & Sons, 2009, pp. 27-28, FIG. 2.5.

Zhou J, et al. "FWI-Guided Q Tomography and Q-PSDM for Imaging in the Presence of Complex Gas Clouds, a Case Study from Offshore Malaysia." *SEG Technical Program Expanded Abstracts*, vol. 32, 2013, pp. 4765-4769.

Denli, H, et al. "Fast Viscoacoustic and Viscoelastic Full Wavefield Inversion," U.S. patent application Ser. No. 14/693,464, U.S. Patent Publication No. 2015/0362622 A1 (Dec. 17, 2015).

Hu W, et al. "A Robust and Accurate Seismic Attenuation Tomography Algorithm." *SEG Technical Program Expanded Abstracts*, vol. 30, 2011, pp. 2727-2731.

Biondi, B and P. Sava., "Wave-equation migration velocity analysis." *SEG Technical Program Expanded Abstracts*, 1999, pp. 1723-1726.

What is claimed is:

1. An iterative method for inversion of seismic data to update a physical property model of subsurface velocity or other physical property comprising:
   (a) iteratively updating the physical property model until a first predetermined resolution of the physical property model is achieved, wherein the updating is performed using full wavefield inversion of the seismic data up to a first frequency threshold and assuming the seismic data is free of attenuation effects;
   (b) extracting geobodies from the updated physical property model;
   (c) obtaining a Q model using the geobodies; and
   (d) updating the physical property model using an inversion process, wherein the Q model is incorporated into the inversion process; and
   (e) repeating steps (a)-(d) until a second predetermined resolution of the physical property model is achieved, wherein the first frequency threshold in step (a) is progressively increased in each repetition.

2. The iterative method of claim 1, further comprising:
   (f) updating the Q model with seismic data at all available frequencies to obtain a full-band Q model; and
   (g) updating the physical property model to obtain a final physical property model, wherein the updating is performed using full-band migration and the full-band Q model.

3. The iterative method of claim 2, further comprising generating, with the computer, an image of a subsurface using the final model, after step (g).

4. The iterative method of claim 2, further comprising managing hydrocarbons using the final model, after step (g).

5. The iterative method of claim 1, wherein the full wavefield inversion used in step (a) is acoustic full wavefield inversion.

6. The iterative method of claim 1, wherein the first predetermined resolution is sufficient to identify geobodies based on the updated physical property model.

7. The iterative method of claim 1, wherein the first frequency threshold is initially 6 Hz.

8. The iterative method of claim 1, wherein the extracting in step (b) comprises identifying regions in the physical property model exhibiting physical property values indicative of attenuation effects.

9. The iterative method of claim 1, wherein obtaining a Q model comprises using a Q-estimation process to generate the Q model based on the geobodies.

10. The iterative method of claim 9, wherein the Q-estimation process is Q tomography.

11. The iterative method of claim 1, wherein the inversion process in step (d) is ray-based tomography.

12. The iterative method of claim 1, wherein the second predetermined resolution is higher than the first predetermined resolution.

13. The iterative method of claim 1, wherein the second predetermined resolution is between 10 and 15 Hz.

14. The iterative method of claim 1, wherein the inversion process in step (d) is viscoacoustic full wavefield inversion.

15. The iterative method of claim 14, further comprising:
   (e) updating the physical property model using ray-based tomography and the Q model.

16. The iterative method of claim 15, further comprising:
   (f) repeating steps (b)-(e) until a second predetermined resolution of the physical property model is achieved, wherein the viscoacoustic full wavefield inversion in step (d) is performed up to a second frequency threshold that is progressively increased in each repetition.

17. The iterative method of claim 16, further comprising:
   (g) updating the Q model with seismic data at all available frequencies to obtain a full-band Q model; and
   (h) updating the physical property model to obtain a final physical property model, wherein the updating is performed using full-band migration and the full-band Q model.

18. The iterative method of claim 16, wherein the second frequency threshold is higher than the first frequency threshold.

19. The iterative method of claim 18, wherein the second frequency threshold is progressively increased up to 15 Hz.

20. The iterative method of claim 1, further comprising:
   updating the Q model after step (c) with seismic data at all available frequencies to obtain a preliminary full-band Q model; and
   using the preliminary full-band Q model to obtain an image of the subsurface using amplitude-only Q migration.

21. An iterative method for inversion of seismic data to update a physical property model of subsurface velocity or other physical property comprising:

(a) iteratively updating the physical property model until a first predetermined resolution of the physical property model is achieved, wherein the updating is performed using full wavefield inversion of the seismic data up to a first frequency threshold and assuming the seismic data is free of attenuation effects;
(b) extracting geobodies from the updated physical property model;
(c) obtaining a Q model using the geobodies; and
(d) updating the physical property model using an inversion process, wherein the Q model is incorporated into the inversion process, wherein the inversion process in step (d) is viscoacoustic full wavefield inversion;
(e) updating the physical property model using ray-based tomography and the Q model; and
(f) repeating steps (b)-(e) until a second predetermined resolution of the physical property model is achieved, wherein the viscoacoustic full wavefield inversion in step (d) is performed up to a second frequency threshold that is progressively increased in each repetition.

22. The iterative method of claim 21, further comprising:
(g) updating the Q model with seismic data at all available frequencies to obtain a full-band Q model; and
(h) updating the physical property model to obtain a final physical property model, wherein the updating is performed using full-band migration and the full-band Q model.

23. The iterative method of claim 21, wherein the second frequency threshold is higher than the first frequency threshold.

24. The iterative method of claim 23, wherein the second frequency threshold is progressively increased up to 15 Hz.

25. An iterative method for inversion of seismic data to update a physical property model of subsurface velocity or other physical property comprising:
(a) iteratively updating the physical property model until a first predetermined resolution of the physical property model is achieved, wherein the updating is performed using full wavefield inversion of the seismic data up to a first frequency threshold and assuming the seismic data is free of attenuation effects;
(b) extracting geobodies from the updated physical property model;
(c) obtaining a Q model using the geobodies; and
(d) updating the physical property model using an inversion process, wherein the Q model is incorporated into the inversion process;
wherein the method further comprises:
updating the Q model after step (c) with seismic data at all available frequencies to obtain a preliminary full-band Q model; and
using the preliminary full-band Q model to obtain an image of the subsurface using amplitude-only Q migration.

* * * * *